Figures 3, 4:
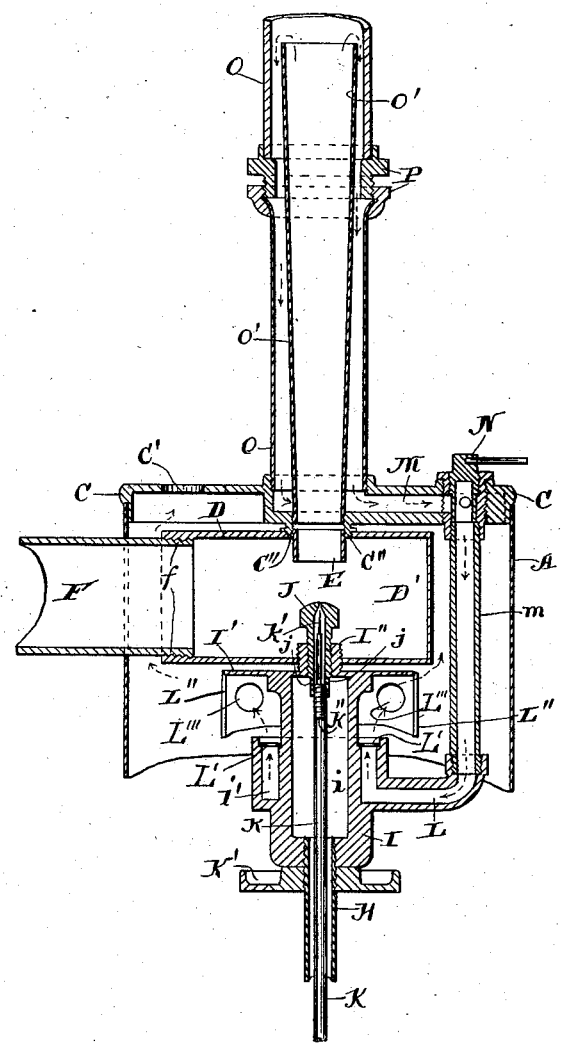

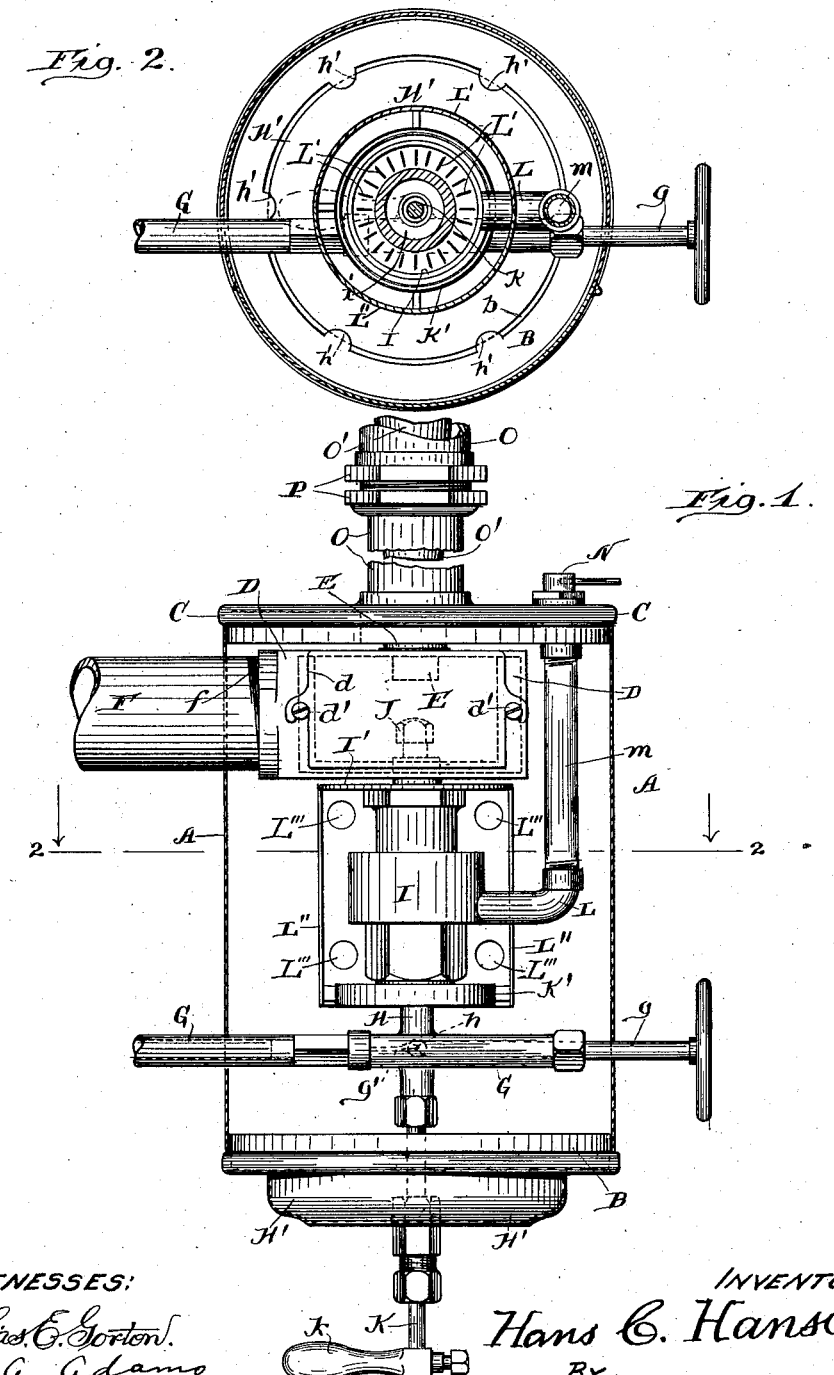

H. C. HANSON.
GASOLENE GENERATOR.
APPLICATION FILED JUNE 26, 1911.

1,027,650.

Patented May 28, 1912.
2 SHEETS—SHEET 2.

WITNESSES:
Chas. E. Gorton.
C. A. Adams.

INVENTOR
Hans C. Hanson,
BY
Charles Turner Brown,
ATTORNEY.

UNITED STATES PATENT OFFICE.

HANS C. HANSON, OF ALBERT LEA, MINNESOTA, ASSIGNOR TO AMERICAN GAS MACHINE COMPANY, OF ALBERT LEA, MINNESOTA, A CORPORATION OF MINNESOTA.

GASOLENE-GENERATOR.

1,027,650.      Specification of Letters Patent.      Patented May 28, 1912.

Application filed June 26, 1911.   Serial No. 635,429.

*To all whom it may concern:*

Be it known that I, HANS C. HANSON, a citizen of the United States, and a resident of Albert Lea, in the county of Freeborn and State of Minnesota, have invented a new and useful Improvement in Gasolene-Generators, of which the following is a specification.

This invention relates to generators which are used to obtain a fuel mixture of gasolene vapor and air for lighting and other purposes. And the object of the invention is to obtain a generator, of the kind named which is economically made, easily controlled, not liable to get out of order or adjustment, and not liable to cause a conflagration.

A further object is to obtain a device which is easily installed, and by persons not particularly skilled in the art to which it pertains, and which presents a finished and pleasing appearance when installed.

In the drawings Figure 1 is a front elevation of a device embodying the invention, with the casing in vertical section, to expose the operative mechanism to view. Fig. 2 is a horizontal section of the device, on line 2—2 of Fig. 1 viewed in the direction indicated by the arrows. Fig. 3 is a vertical section of the device. Fig. 4 is a horizontal section of pipes which form elements of the device, showing their relation to each other.

Similar letters refer to similar parts throughout the several views.

A is the outer shell or jacket of the device.

B is the bottom or base and C the top to which shell A is secured.

C' are apertures in top C.

C'' is an annular flange on the under side of top C, and is provided with internal and external screw threads.

D is a casing. Casing D is provided with screw threaded apertures in the top and bottom walls, and in one of the end walls, and is provided with an aperture in what I term the front side wall.

d is a cover to the aperture in the side wall. Cover d is secured to casing D by screws d'. The cover d is easily removed by loosening screws d'.

D' is the chamber in casing D.

Casing D is rigidly attached to the top C by the screw threads in the aperture of the top horizontal wall fitting onto the external screw threads on the annular flange C''.

E is a screw threaded nipple which is secured in position in chamber D' by the screw threads thereon fitting into the internal screw threads of flange C''.

F is a pipe arranged to admit air to chamber D'. Pipe F is provided with screw threads f, and is attached to casing D by said screw threads fitting the screw threads in the aperture in the end wall of casing D.

G is a gasolene supply pipe provided with a valve seat.

g is the stem of needle valve g', and said needle valve is arranged to seat in and close pipe G.

H is a pipe provided with screw threads at its upper end which fit into internal screw threads in the lower end of vaporizer I. Pipe G communicates with pipe H on the discharge side of the needle valve g', through aperture h, (see Fig. 4). Pipe H communicates with chamber i of the vaporizer I.

H' is a cup or tray secured on stem K, adjacent to base B. Base B is provided with lugs h' and with an aperture of larger diameter than cup H' to admit air into casing A, to support combustion, as is hereinafter described.

I is a vaporizer provided with chamber i and i' is a chamber surrounding the vaporizer chamber. The upper end of vaporizer I is provided with the disk I', and with the annular flange I''. Annular flange I'' is provided with internal and external screw threads. Vaporizer I is attached to the shell or casing D by the external screw threads on annular flange I'' fitting into the internal screw threads in the aperture in the bottom horizontal wall of said casing.

J is a gasolene vapor discharge head which is provided with holes j and with external screw threads and is attached to the vaporizer by said threads fitting into the internal screw threads in the annular flange I''.

K is a valve stem in pipe H. Stem K is provided with a handle k at its lower end, with needle valve k' at its upper end, and with screw threads k''. Stem K extends through the chamber i of vaporizer I, (see Fig. 3), and seats to close the head J. The screw threads $k''$ fit corresponding screw threads in head J.

K' is a tray attached to the pipe H by means of a hole in said tray, through which the pipe extends, fitting closely thereinto.

L is the inlet to chamber $i'$ surrounding vaporizer I and L' are the outlets therefrom.

L'' is a shield to the vaporizer I. Shield L'' is provided with apertures L''' for the supply of air to the flame at outlets L' of chamber $i'$, and the discharge of the products of combustion from said flame.

M is a chamber forming a passage way in top C and $m$ is a pipe connecting passage way M and inlet L.

N is a stop cock by means of which communication between passage way M and pipe $m$ is made and broken.

O is a discharge pipe provided with external screw threads fitting corresponding screw threads in top C. O' is a discharge pipe which is provided with external screw threads at its lower end fitting into corresponding threads in the lower wall of passage way M, in said top C, (in flange C''). The discharge pipe O' flares outwardly as it extends upward from the flange C'', and is of less diameter at its upper end than is the inside diameter of discharge pipe O, so that some of the combustible mixture delivered from chamber D' into discharge pipe O' and from thence into discharge pipe O, may flow over the upper edge of said pipe O' and downward into pipe O into passage way M and from thence, (when cock N is open) into pipe $m$, and inlet L of chamber $i'$.

P is a union interposed in pipe O.

The tray K' is used for the purpose of starting the device into operation, and for such purpose benzin, alcohol or other suitable fluid is poured into said tray and ignited. When a flame is obtained from material contained in tray K' gasolene is vaporized in chamber $i$ of vaporizer I, and upon opening valve $k'$ said vapor escapes through the aperture in head J with sufficient force to entrain along therewith air in chamber D'. Air is continuously supplied to chamber D' through pipe F, and said gasolene vapor and air, (forming a fuel mixture), is forced into discharge pipe O through inner pipe O'. Chamber or passage way M is in communication with discharge pipe O. The gasolene vapor mixed with air is continuously forced from chamber D' as hereinbefore described, and some thereof is conducted through pipe O to any place where it is desired to burn the same, and some flows between pipes O' and O into chamber M, and (when the valve N is open), it flows through pipe $m$ to chamber $i'$ and from said chamber through apertures L' (see Figs. 2 and 3) where it is ignited. The upper end of vaporizer I (including disk I'), contains sufficient metal which is heated by the flame of the burning fuel mixture discharged from apertures L' of chamber $i'$ to continuously vaporize gasolene in chamber $i$, and the quantity of gasolene so vaporized is sufficient to supply a combustible mixture to pipe O to be conveyed to any suitable place for use, in addition to supplying to chamber $i'$ the quantity necessary to maintain a vaporizing flame above apertures L' from the mixture flowing therefrom. The device will, therefore, operate continuously so long as gasolene is supplied to the device through pipe G. The combustible mixture delivered through pipe O is utilized principally for lighting purposes.

I claim:—

In a generator the combination of a top consisting of a casting provided with a central aperture, a horizontal passage way communicating therewith, and a discharge aperture, a valve to said discharge aperture, a pipe attached to said top and communicating with the horizontal passage way, a mixing chamber attached to said top, said chamber provided with apertures in the top, bottom and one of the side walls, a discharge pipe connected to said top and communicating at its upper end with the first named pipe and at its lower end with the mixing chamber, a vaporizer attached to the mixing chamber and communicating therewith, said vaporizer consisting of a casting provided with a central vaporizing chamber and an additional chamber concentric with the vaporizing chamber, a passage way communicating with the discharge side of the valve in the top and with the additional chamber in the casting and a shield attached to said top and means to introduce a vaporizable combustible fluid into said central chamber.

HANS C. HANSON.

In the presence of—
CHAS. A. GORDER,
WM. C. CHRISTENSEN.